(12) United States Patent
Nilsson et al.

(10) Patent No.: US 9,137,749 B2
(45) Date of Patent: Sep. 15, 2015

(54) NODE IN A WIRELESS COMMUNICATION SYSTEM, THE NODE HAVING DIFFERENT FUNCTIONAL MODES

(75) Inventors: Andreas Nilsson, Gothenburg (SE); Stefan Johansson, Romelanda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 45 days.

(21) Appl. No.: 14/122,446

(22) PCT Filed: May 27, 2011

(86) PCT No.: PCT/EP2011/058738
§ 371 (c)(1),
(2), (4) Date: Nov. 26, 2013

(87) PCT Pub. No.: WO2012/163386
PCT Pub. Date: Dec. 6, 2012

(65) Prior Publication Data
US 2014/0105074 A1    Apr. 17, 2014

(51) Int. Cl.
*H04W 52/02* (2009.01)
*H04L 5/14* (2006.01)
*H01Q 21/08* (2006.01)
*H01Q 3/26* (2006.01)

(52) U.S. Cl.
CPC ............. *H04W 52/0206* (2013.01); *H01Q 3/26* (2013.01); *H01Q 21/08* (2013.01); *H04L 5/14* (2013.01)

(58) Field of Classification Search
CPC ..... H04L 5/14; H04W 52/0206; H01Q 21/08; H01Q 3/26
See application file for complete search history.

(56) References Cited

U.S. PATENT DOCUMENTS 5,818,385 A * 10/1998 Bartholomew ............... 342/372
2003/0073463 A1   4/2003 Shapira
(Continued)

FOREIGN PATENT DOCUMENTS

CN   1579035 A   2/2005
CN   1735998 A   2/2006
(Continued)

OTHER PUBLICATIONS

Chinese Office Action and Search Report from corresponding application CN 20118071202.X, dated Nov. 26, 2014, 13 pages.

*Primary Examiner* — Melvin Marcelo
*Assistant Examiner* — Gbemileke Onamuti
(74) *Attorney, Agent, or Firm* — Rothwell, Figg, Ernst & Manbeck, P.C.

(57) ABSTRACT

The present invention relates to a node in a wireless communication system, which comprises at least one transceiver unit, a first and a second antenna function. The antenna functions comprise a first and a second port connection. The transceiver unit is arranged to communicate by means of at least one frequency band. Each port connection is connectable to said transceiver unit via electrical signal delays of different magnitudes. In a first mode of operation, a certain resulting main radiation lobe is acquired when the antenna functions are receiving or transmitting for each frequency in the frequency band. Said main radiation lobe has a main pointing direction with a certain angular direction in azimuth and elevation with respect to a fixed angular direction. The angular direction for every certain frequency is different from the angular direction for any other frequency.

18 Claims, 12 Drawing Sheets

(56) References Cited

U.S. PATENT DOCUMENTS

2003/0146880 A1 8/2003 Chiang et al.
2007/0205955 A1 9/2007 Korisch et al.

FOREIGN PATENT DOCUMENTS

| EP | 2149992 A1 | 2/2010 |
| WO | 01/06595 A2 | 1/2001 |

* cited by examiner

NODE IN A WIRELESS COMMUNICATION SYSTEM, THE NODE HAVING DIFFERENT FUNCTIONAL MODES

CROSS REFERENCE TO RELATED APPLICATION(S)

This application is a 35 U.S.C. §371 National Phase Entry Application from PCT/EP2011/058738 filed May 27, 2011, the disclosure of which is incorporated by reference.

TECHNICAL FIELD

The present invention relates to a node in a wireless communication system, the node comprising at least one transceiver unit, a first antenna function and a second antenna function. The first antenna function comprises at least a first antenna function first port connection and the second antenna function comprising at least a second antenna function first port connection. The transceiver unit is arranged to communicate by means of at least one frequency band.

The present invention also relates to a method in a node in a wireless communication system, the method comprising the step of receiving and/or transmitting signals using at least a first antenna function and a second antenna function when communicating using at least one frequency band.

BACKGROUND

The use of mobile phones and wireless broadband has increased rapidly during the last decade, and it is expected to grow even faster the coming years. To meet the expected demands, the operators will have to increase the capacity in the communication systems. One way to do this is to deploy more base stations and use smaller cells, such that a more efficient spatial reuse can be utilized and the capacity of the system can be increased. But with many small cells and a dense deployment of base stations, the so-called co-channel interference between different cells will probably be increased. The large amount of base stations will also result in a higher energy consumption which will cost a lot of money and has a negative environmental effect.

The load of a typical cell varies over the day, but typically, the load is relatively low. Unfortunately, the base stations consume quite much power even though there is no data transmitted Therefore there is a need for reducing the output power of the base stations, for example by turning off power amplifiers when not needed. Previously, this has been done as so-called antenna muting, which basically means that one or several antennas and their corresponding radio chains are turned of when they are not needed. However, this means that relatively expensive equipment is unused during certain times.

There is thus a need for a more efficient handling of reduction of power consumption, at the same time as the base station equipment is used as efficiently as possible.

SUMMARY

It is an object of the present invention to provide a more efficient handling of reduction of power consumption, at the same time as the base station equipment is used as efficiently as possible.

This object is achieved by means of a node in a wireless communication system, the node comprising at least one transceiver unit, a first antenna function and a second antenna function. The first antenna function comprises at least a first antenna function first port connection and the second antenna function comprising at least a second antenna function first port connection. The transceiver unit is arranged to communicate by means of at least one frequency band. Each port connection is at least connectable to said transceiver unit and is associated with a corresponding electrical signal delay with respect to the transceiver unit. All electrical signal delays are of different magnitudes, such that in a first mode of operation, for each frequency in the frequency band, a certain resulting main radiation lobe is acquired when the antenna functions are receiving and/or transmitting. Said main radiation lobe has a main pointing direction with a certain angular direction in azimuth and elevation with respect to a fixed angular direction in azimuth and elevation. The angular direction for every certain frequency is different from the angular direction for any other frequency.

According to an example, said port connections are connectable to said transceiver unit via a power combining and/or power dividing means and a first switching means positioned between a common port of the power combining and/or power dividing means and said transceiver unit. The power combining and/or power dividing means comprises an individual port for each antenna function port connection.

According to another example, the power combining and/or power dividing means is connectable to the first antenna function first port connection via a second switching means. In this case, the first switching means and the second switching means may be arranged to switch said transceiver unit to be directly connected to the first antenna function first port connection in a second switch mode, and to switch said transceiver unit to be connected to the first antenna function first port connection via the power combining and/or power dividing means in a first switch mode.

Furthermore, the power combining and/or power dividing means may be connectable to the second antenna function first port connection via a third switching means. The third switching means is arranged to switch said transceiver unit to be connected to the second antenna function first port connection in a first switch mode, and to switch a further transceiver unit to be connected to the second antenna function first port connection in a second switch mode.

According to another example the first switch mode and the second switch mode is common for the first switching means, second switching means and third switching means, the first switch mode corresponding to the first mode of operation.

According to another example, each antenna function comprises orthogonally polarized antenna elements, where each antenna function comprises a port connection for each polarization.

This object is also achieved by means of a method in a node in a wireless communication system, the method comprising the step of receiving and/or transmitting signals using at least a first antenna function and a second antenna function when communicating using at least one frequency band. The method further comprises the step of combining and delaying the signals to and/or from the antenna functions such that for each frequency in the frequency band, a certain resulting main radiation lobe is acquired when the antenna functions are receiving and/or transmitting. A main pointing direction of said main radiation lobe have a certain angular direction in azimuth and elevation with respect to a fixed angular direction in azimuth and elevation. The angular direction for each frequency is different from the angular direction for any other frequency.

According to an example, the method also comprises the step of switching at least one transceiver unit between a first antenna function first port connection and a power combining and/or power dividing means.

Furthermore, the method may also comprise the step of switching a second antenna function first port connection between a second transceiver unit and an individual port is of the power combining and/or power dividing means via a second electrical signal delay.

Other examples are apparent from the dependent claims

A number of advantages are provided by means of the present invention.

Today, the antennas of base stations, user terminals, repeaters and relays transmit energy in the same directions for the whole frequency band. However, often only a part of the frequency band is used in every direction, which means that unnecessary much transmission power is used and the inter-cell interference becomes unnecessarily high.

By means of the present invention, nodes such as base stations, relays, repeaters and user terminals may save energy which will reduce the cost and favor the environment. Furthermore, the inter-cell interference will be reduced which will increase the capacity of the communication system.

BRIEF DESCRIPTION OF THE DRAWINGS

The present invention will now be described more in detail with reference to the appended drawings, where.

DETAILED DESCRIPTION

Figure 1A:
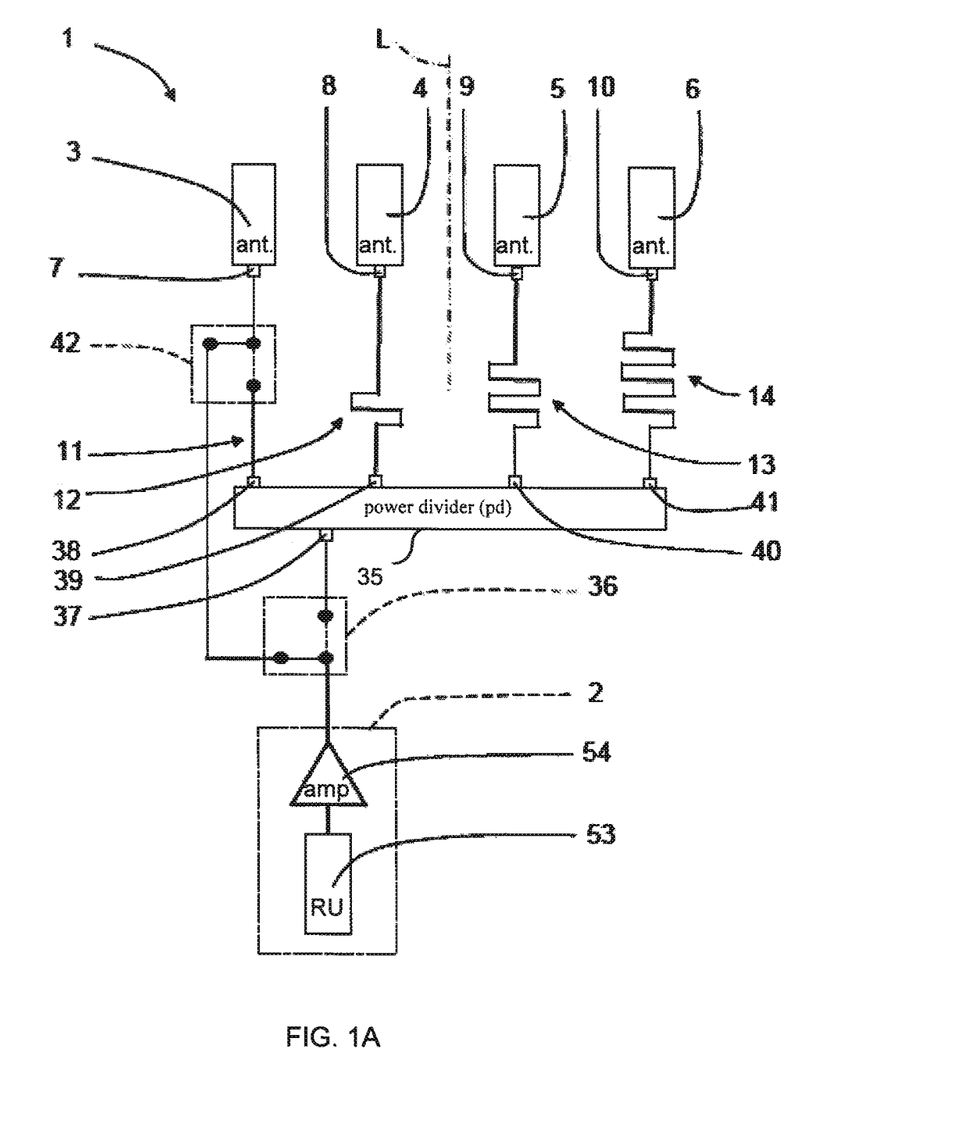
FIG. 1a schematically shows a node according to a first example of the present invention in a second mode of operation.
Figure 2A:
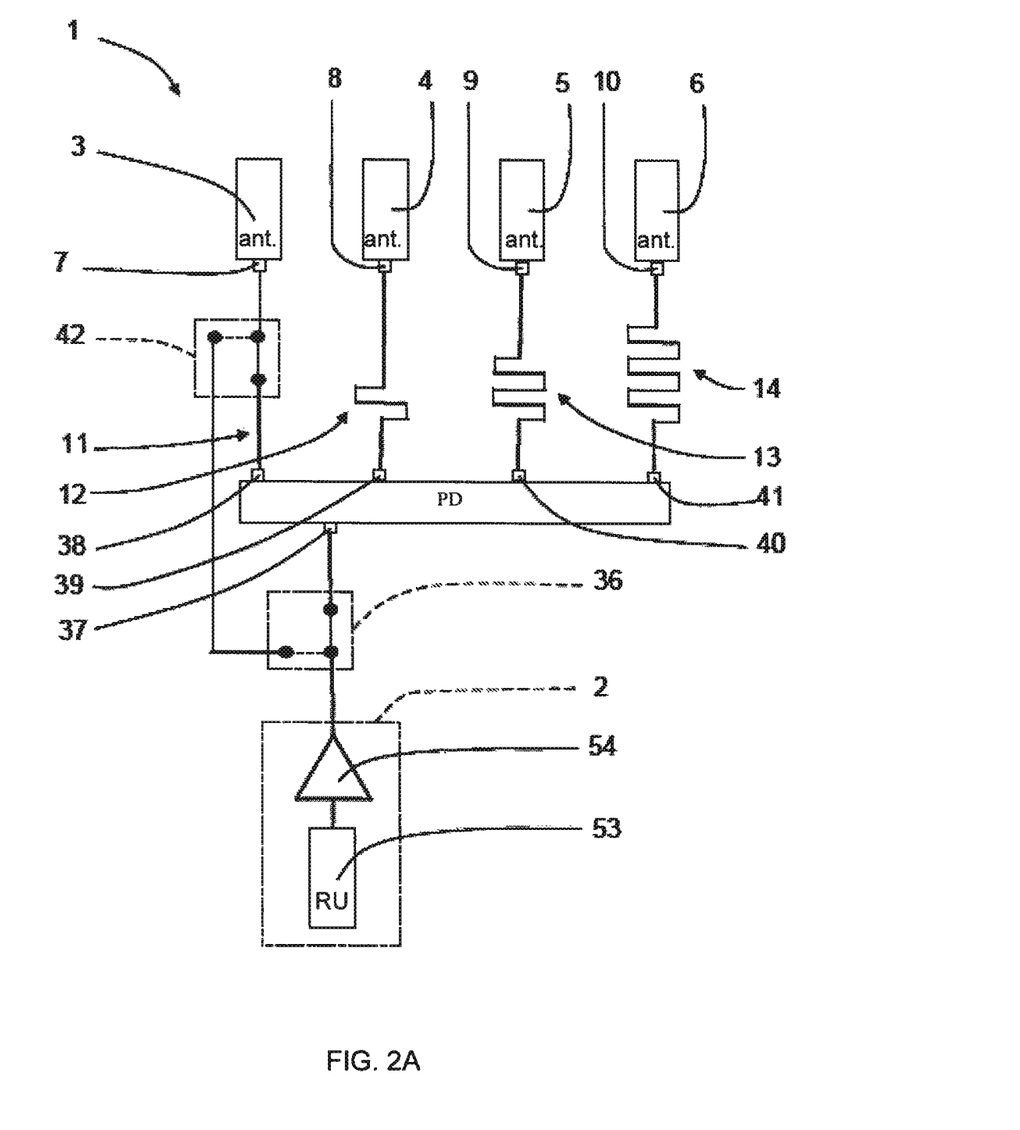
FIG. 2a schematically shows the node according to the first example of the present invention in a second mode of operation.

With reference to FIG. 1a and FIG. 2a, there is a node 1 in a wireless communication system according to a first example. The node 1 comprises a transceiver unit 2, a first antenna function 3, a second antenna function 4, a third antenna function 5 and a fourth antenna function 6. The first antenna function 3 comprises a first antenna function first port connection 7, the second antenna function 4 comprises a second antenna function first port connection 8, the third antenna function 5 comprises a third antenna function first port connection 9 and the fourth antenna function 6 comprises a fourth antenna function first port connection 10. The transceiver unit 2 is arranged to communicate by means of at least one frequency band B, and comprises a radio unit 53 and an amplifier unit 54.

For this example, and all other following examples, the description will be directed towards transmission of signals via the antenna functions 3, 4, but of course the present invention is just as applicable for reception of signals.

Figure 1B:
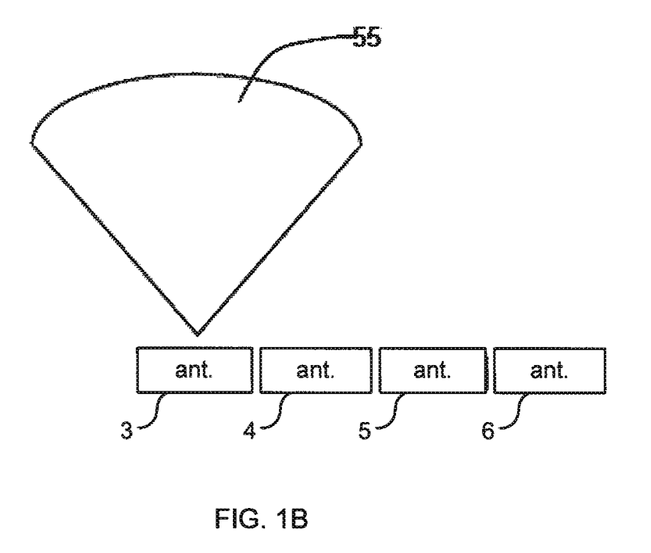
FIG. 1b schematically shows a top view of the node according to the first example of the present invention in the second mode of operation.

As shown in FIG. 1a, showing a second mode of operation, the transceiver unit 2 is connected the first antenna function 3 via a first switching means 36 and second switching means 42. The other antenna functions 4, 5, 6 are not connected to the transceiver unit 2. With reference also to FIG. 1b, showing a schematical top view of the antenna function arrangement, it is shown now the first antenna function 3 transmits via a single antenna radiation lobe 55.

As shown in FIG. 2a, showing a first mode of operation, the first switching means 36 instead connects the transceiver unit 2 to a common port 37 of a power divider 35, the power divider 35 having individual output ports 38, 39, 40, 41.

According to the present invention, each individual output port 38, 39, 40, 41 is connected to a corresponding antenna function port connection 7, 8, 9, 10 via corresponding phase delay lines 11, 12, 13, 14.

More in detail, a first output port 38 is connected to the first antenna function first port connection 7 via a first phase delay line 11, a second output port 39 is connected to the second antenna function first port connection 8 via a second phase delay line 12, a third output port 40 is connected to the third antenna function first port connection 9 via a third phase delay line 13 and a fourth output port 41 is connected to the fourth antenna function first port connection 10 via a fourth phase delay line 14.

Each phase delay line 11, 12, 13, 14 is constituted by an electrical conductor of a certain length, such that there are different phase delays between each output port 38, 39, 40, 41 and corresponding antenna function port connection 7, 8, 9, 10. This means that a signal that is transmitted from the transceiver unit 2 is divided such that it is fed to all the antenna functions 3, 4, 5, 8 with a certain delay for each antenna function 3, 4, 5, 6 such that a main radiation lobe is acquired. By means of the phase delay lines 11, 12, 13, 14, the resulting main radiation lobe will have a certain pointing direction for a certain frequency.

The frequency band B comprises a first frequency $f_1$, a second frequency $f_2$, a third frequency $f_3$ and a fourth frequency $f_4$.

Figure 2B:
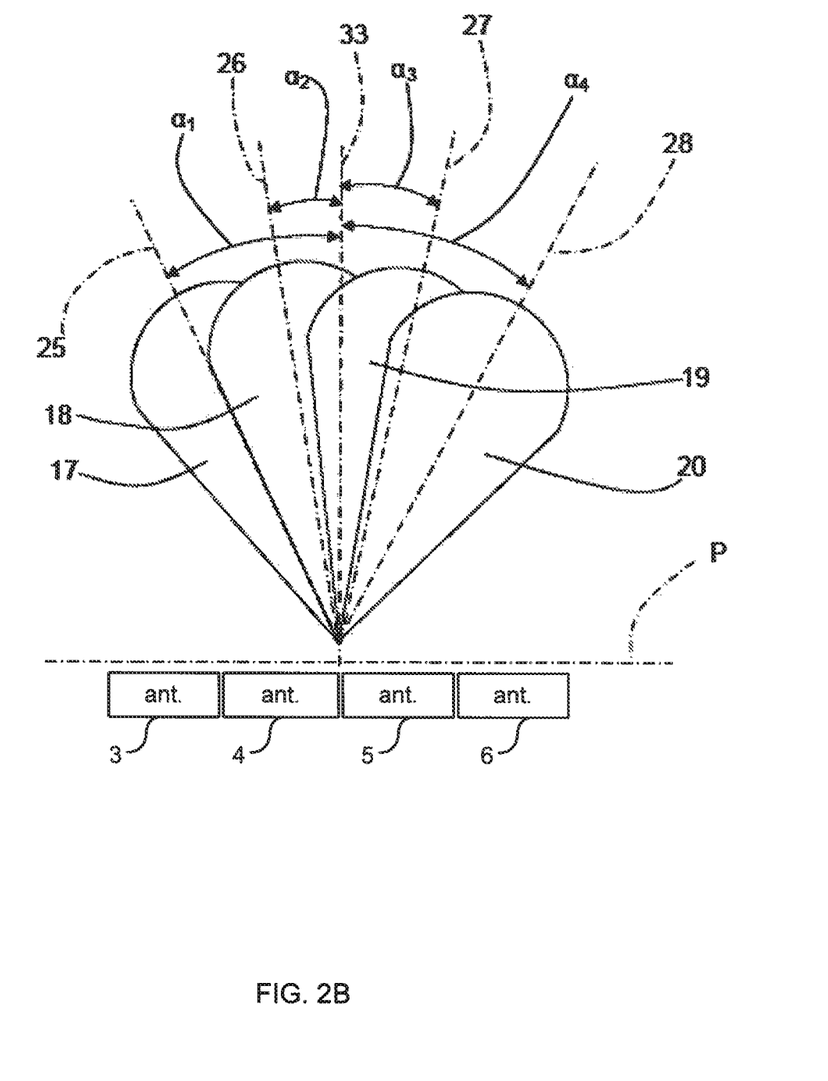
FIG. 2b schematically shows a top view of the node according to the first example of the present invention in the second mode of operation.

This is illustrated in FIG. 2b showing a schematical top view of the antenna functions 3, 4, 5, 6, where, for the first frequency $f_1$ there is a first main radiation lobe 17; for the second frequency $f_2$ there is a second main radiation lobe 18; for the third frequency $f_3$, there is a third main radiation lobe 19; and for the fourth frequency $f_4$, there is a fourth main radiation lobe 20. Each main radiation lobe has a corresponding main pointing direction 25, 26, 27, 28, where each main pointing direction 25, 26, 27, 28 has a certain angular direction $\alpha_1$, $\alpha_2$, $\alpha_3$, $\alpha_4$ in azimuth with respect to a fixed angular direction 33. The fixed angular direction 33 is here directed perpendicular to a plane P running along a plane in which the apertures of the antenna functions 3, 4, 5, 6 are distributed, the fixed angular direction 33 also being known as boresight.

Regarding the elevation angle, the main pointing directions 25, 26, 27, 28 are assumed to be pointing in the same elevation angle along a plane than runs through the fixed angular direction 33.

For all examples in this description, the antenna functions 3, 4, 5, 6 have a longitudinal extension L, defining a height of the antenna functions and, for reasons of clarity, being indicated only in FIG. 1, although the longitudinal extension L is applicable for all examples of the present invention. The elevation angle is defined as a direction along said longitudinal extension, and the azimuth angle is defined as a direction perpendicular to longitudinal extension, running around the antenna functions 3, 4, 5, 6 as shown in FIG. 2b.

The elevation plane mentioned may run perpendicular to the longitudinal extension L.

In this example, as shown in FIG. 2b, the first frequency $f_1$ provides a first main pointing direction 25 with a first azimuth angle $\alpha_1$, the second frequency $f_2$ provides a second main pointing direction 26 with a second azimuth angle $\alpha_2$, the third frequency $f_3$ provides a third main pointing direction 27 with a third azimuth angle $\alpha_3$, and the fourth frequency $f_4$ provides a fourth main pointing direction 28 with a fourth azimuth angle $\alpha_4$.

The azimuth $\alpha_1, \alpha_2, \alpha_3, \alpha_4$ are in the examples such that the first main pointing direction 25 to the fourth main pointing direction 28 successively change from a leftmost direction to a rightmost direction with directions as shown in FIG. 2b. This is a consequence of the phase delay lines 11, 12, 13, 14 being longer and longer from the first phase delay line 11 to the fourth phase delay line 14.

In the first mode of operation, the gain will be increases compared with the second mode of operation, which means that less power needs to be transmitted in the first mode of operation. The first mode of operation could be used during low traffic scenarios, for example during the night, to save energy. During day-time, when the traffic is usually higher, the second mode of operation could be used instead.

Regarding control channel information, the node 1 could be reconfigured to several carriers so that the control channels will be distributed over the whole frequency band.

In this example, with reference to FIG. 1a and FIG. 2a, the first switching means 36 and the second switching means 42 are arranged to switch said transceiver unit 2 to be directly connected to the first antenna function first port connection 7 in a second switch mode, and to switch said transceiver unit 2 to be connected to all the antenna function port connections 7, 8, 9, 10 via the power divider 35 in a first switch mode. The first switch mode corresponds to the first mode of operation, and the second switch mode corresponds to the second mode of operation.

Figure 3A:
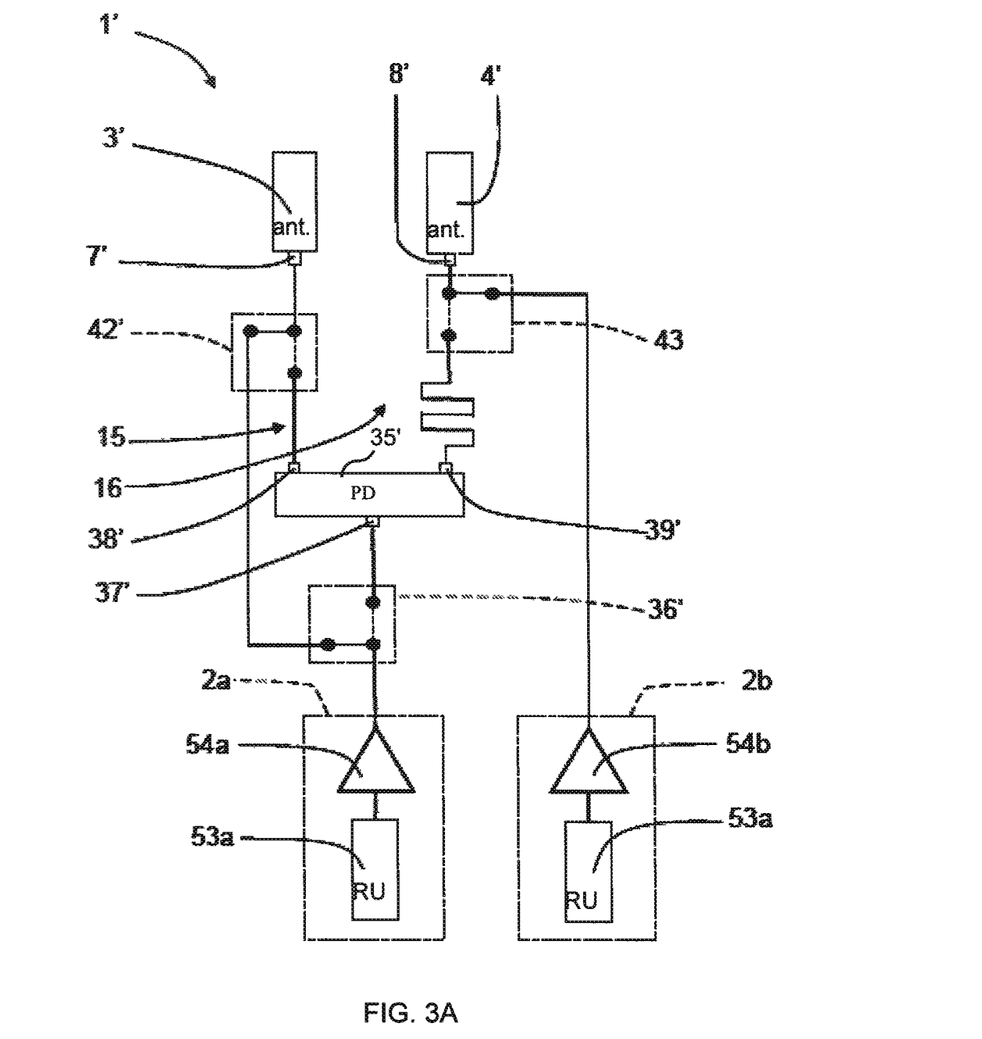
FIG. 3a schematically shows a node according to a second example of the present invention in a second mode of operation.
Figure 4A:
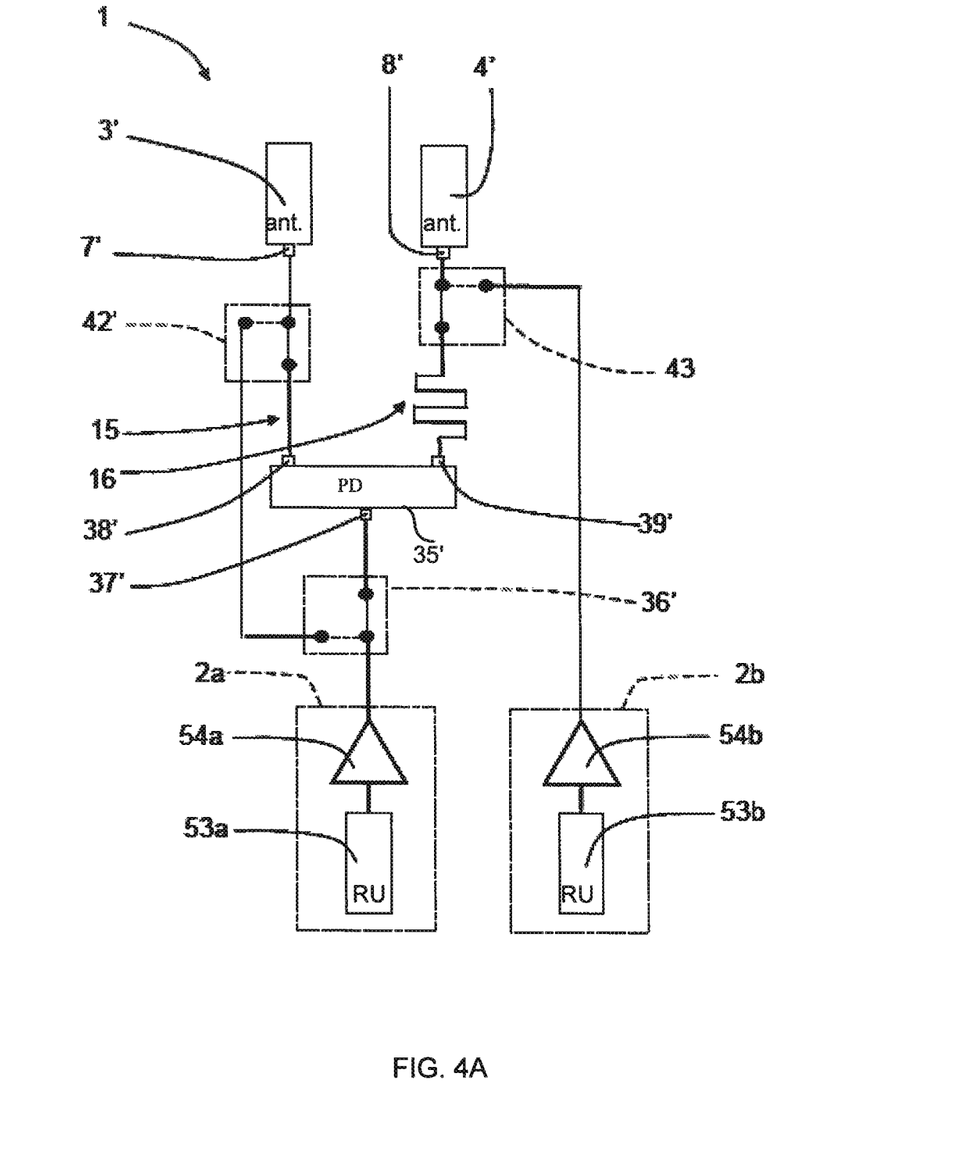
FIG. 4a schematically shows the node according to the second example of the present invention in a second mode of operation.

In a second example, with reference to FIG. 3a and FIG. 4a, there is a node 1' comprising a first transceiver unit 2a, a second transceiver unit 2b, a first antenna function 3' and a second antenna function 4'. The first antenna function 3' comprises a first antenna function first port connection 7' and the second antenna function 4' comprises a second antenna function first port connection 8'. The transceiver units 2a, 2b are arranged to communicate by means of at least one frequency band B', and each comprises a corresponding radio unit 53a, 53b and an amplifier unit 54a, 54b.

Figure 3B:
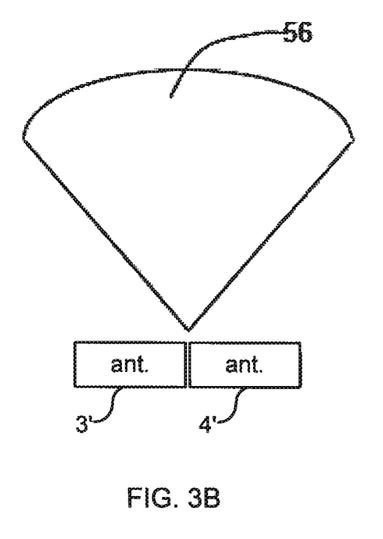
FIG. 3b schematically shows a top view of the node according to the second example of the present invention in the second mode of operation.

As shown in FIG. 3a, showing a second mode of operation, the first transceiver unit 2a is connected the first antenna function 3' via a first switching means 36' and second switching means 42'. Furthermore, the second transceiver unit 2b is connected the second antenna function 4' via a third switching means 43. With reference also to FIG. 3b, showing a schematical top view of the antenna function arrangement, it is shown how the first antenna function 3' and the second antenna function 4' transmits via a resulting antenna radiation lobe 56.

As shown in FIG. 4a, showing a first mode of operation, the first switching means 36' instead connects the first transceiver unit 2a to a common port 37' of a power divider 35', the power divider 35' having individual output ports 38', 39'.

In accordance with the present invention, each individual output port 38', 39' is connected to a corresponding antenna function port connection 7', 8' via corresponding phase delay lines 15, 16.

More in detail, a first output port 38' is connected to the first antenna function first port connection 7' via a first phase delay line 15, and a second output port 39' is connected to the second antenna function first port connection 8' via a second phase delay line 16.

As in the first example, the frequency band B' comprises a first frequency $f_1'$, a second frequency $f_2'$, a third frequency $f_3'$ and a fourth frequency $f_4'$.

Furthermore, in the first mode of operation, a signal that is transmitted from the first transceiver unit 2a is divided such that it is fed to all the antenna functions 3', 4' with a certain delay for each antenna function 3', 4, such that a main radiation lobe is acquired. By means of the phase delay lines 15, 16, the resulting main radiation lobe will have a certain pointing direction for a certain frequency as in the previous example.

Figure 4B:
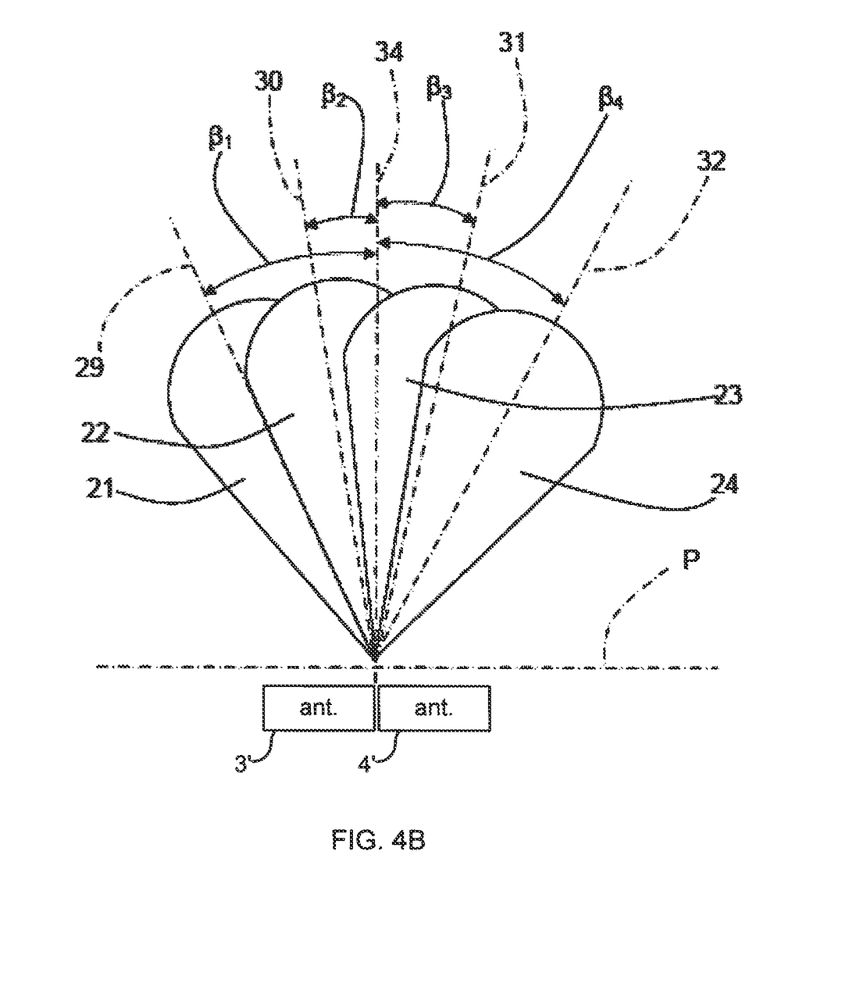
FIG. 4b schematically shows a top view of the node according to the second example of the present invention in the second mode of operation.

This is illustrated in FIG. 4b showing a schematical top view of the antenna functions 3, 4, 5, 6, where, for the first frequency $f_1'$ there is a first main radiation lobe 21; for the second frequency $f_2'$ there is a second main radiation lobe 22; for the third frequency $f_3'$, there is a third main radiation lobe 23; and for the fourth frequency $f_4'$, there is a fourth main radiation lobe 24. Each main radiation lobe has a corresponding main pointing direction 29, 30, 31, 32, where each main pointing direction 29, 30, 31, 32 has a certain angular direction $\beta_1, \beta_2, \beta_3, \beta_4$ in azimuth with respect to a fixed angular direction 34. As previously, the fixed angular direction 34 is directed perpendicular to the plane P.

The second example illustrates a node 1' with two transceivers 2a, 2b, which means that the node 1 can be used for precoding and multi-layer transmission in the second mode of operation. When there is a low traffic load in the system, the second transceiver 2b will be turned off in order to save energy in the first mode of operation. In order to be able to use the second antenna function 4', both antenna functions 3', 4' are connected to the same transceiver 2a. In the second mode of operation, there is one base band for each transceiver 2a, 2b, but in the first mode of operation, there is only one base band left.

Figure 5:
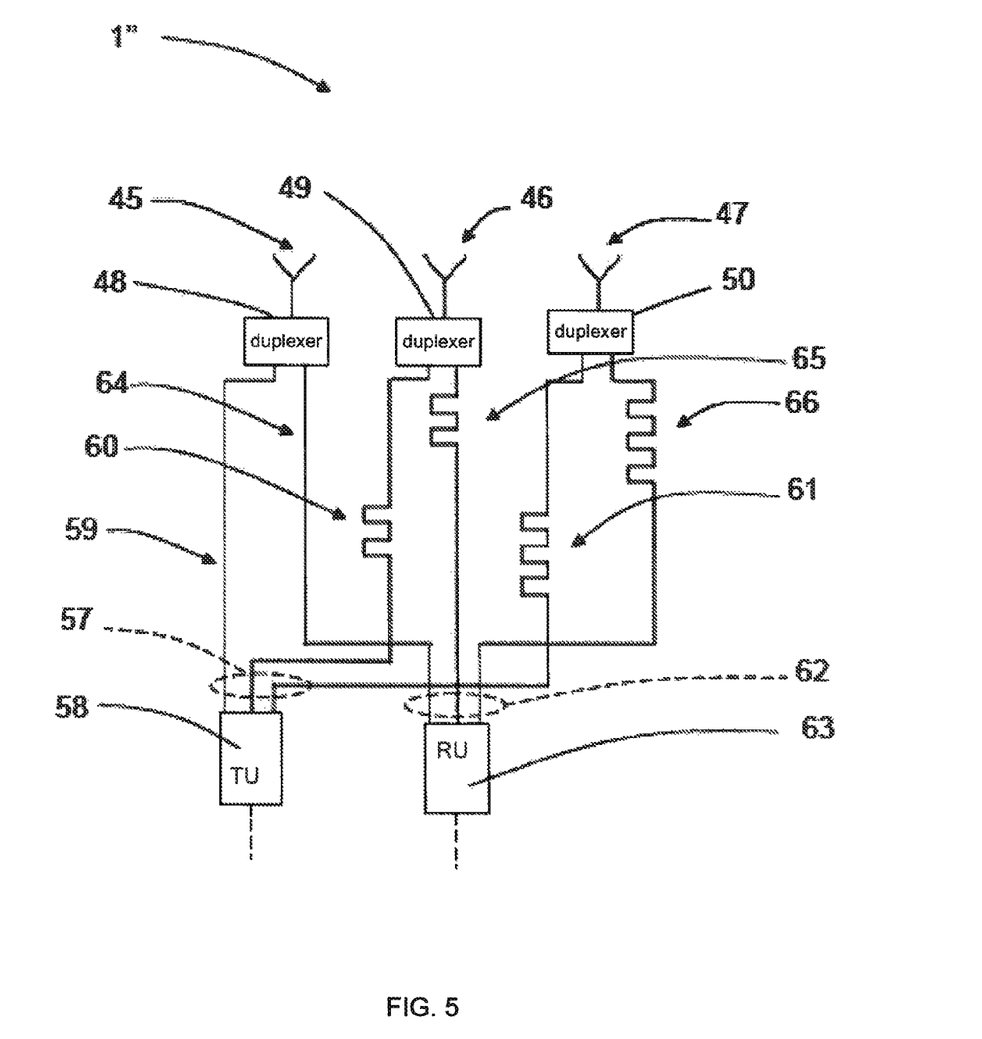
FIG. 5 schematically shows a node according to a third example of the present invention.

In a following third example, it will be described how the present invention can be applied to an FDD (Frequency Division Duplex) system. With reference to FIG. 5, an antenna array consisting of a first antenna function 45, a second antenna function 4 and a third antenna function 47 is used.

A first set of three connecting lines 57 connect a transmitter unit 58 to a first duplexer 48, a second duplexer 49 and a third duplexer 50, respectively. These three connecting lines 57 each comprise a corresponding phase delay 59, 60, 61. In a corresponding way, a second set of three connecting lines 62 connect a receiver unit 63 to the first duplexer 48, the second duplexer 49 and the third duplexer 50, respectively. These three connecting lines 62 each comprise a corresponding phase delay 64, 65, 66.

Each duplex filter 48, 49, 50 is comprised in a corresponding antenna function 45, 46, 47 such that each antenna function 45, 46, 47 is arranged for both transmission and reception.

Generally, for an FOD system some calculations are needed in order to achieve about the same coverage for downlink as for uplink. A downlink frequency band starts at $f_{start}$ and ends at $f_{stop}$ where $f_{center}$ is the middle frequency. Furthermore, y denotes the length difference of the connecting lines for two adjacent antenna functions. In order to let the coverage be symmetrical around broad side, y should be multiples of $\lambda_0$, which is the wavelength for $f_{center}$, see equation (1) below:

$$y = x\lambda_0 \quad (1)$$

where x is an integer.

The phase difference at the excitation for two adjacent antennas, $\alpha 1$, for the frequency $f_{start}$ is calculated using equation (2) below:

$$\alpha_1 = \frac{y 2\pi}{\lambda_1} \pm N 2\pi = \frac{x\lambda_0 2\pi}{\lambda_1} \pm N 2\pi \quad (2)$$

where $\lambda_1$ is the wavelength for $f_{start}$ and N is an arbitrary integer. The angle $\theta_1$ of the main pointing direction of the radiation lobe for $f_{start}$ is be calculated using equation (3) below:

$$\sin(\theta_1) = \frac{\alpha_1 \lambda_1}{2\pi d} \quad (3)$$

where d is the distance between the antenna elements.

By inserting equation (2) in to equation (3) one gets equation (4) below:

$$d \sin(\theta_1) = x\lambda_0 \pm N\lambda_1 \quad (4)$$

By testing different integers of x, the angle $\theta_1$ could be determined. The angle $\theta_2$ of the main pointing direction of the radiation lobe for $f_{stop}$ will be about the same as $\theta_1$ but pointing in the opposite direction. The uplink is then calculated in the same way.

In order to show how the above could be used, some exemplary figures will be used for the third example.

In the example, the downlink uses the frequency band 1700-1800 MHz and the uplink uses the frequency band 1900-2000 MHz. The antenna separation d is 0.5λ@1850 MHz. First, different values for x are tested for the downlink. For x=5, $\theta_1$ and $\theta_2$ become 18° according to equation (4).

Since it is desirable to achieve about the same coverage for the uplink, different values for x are tested again. x=7 gives $\theta_1$ and $\theta_2$=20°. The resulting radiation pattern for the uplink can be seen in FIG. 13. It is thus evident that the coverage of the downlink and the uplink almost are the same.

For a TDD (Time Division Duplex) system, the calculations can be made a bit simpler if one sets $d=\lambda_0/2$. Then equation (4) can be rewritten in to equation (5) below:

$$\sin(\theta_1) = 2x \pm 2N \frac{\lambda_1}{\lambda_0} \quad (5)$$

The present invention can also be used for aggregated spectrums, for example two frequency bands such as 1800-1840 MHz and 2200-2240 MHz.

Figure 6:
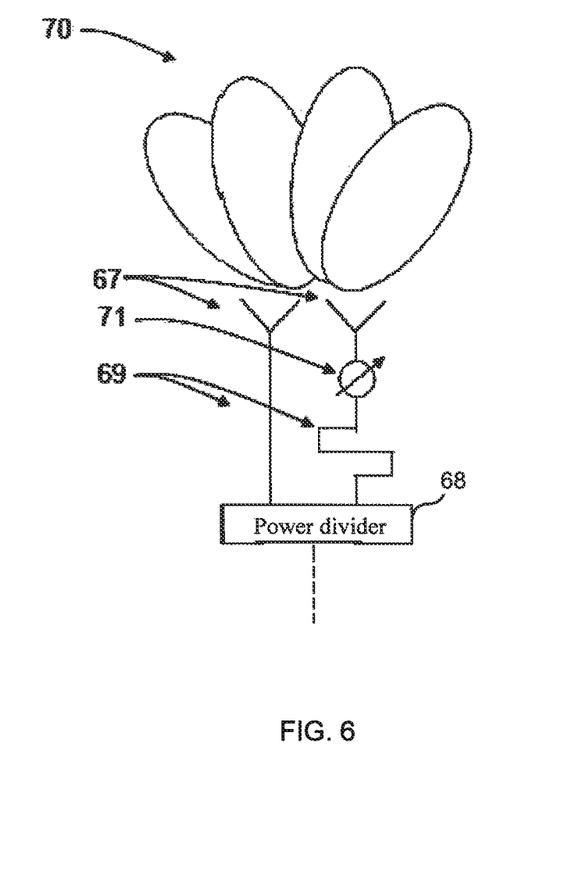
FIG. 6 schematically shows a node according to a fourth example of the present invention.

It is not necessary to make one single product for each frequency band. In a fourth example, a first operator uses the frequency band 700-750 MHz and a second operator uses the frequency band 750-800 MHz. With fixed phase delays, these two different frequency bands will point in different directions. However, as shown in FIG. 6, two antenna functions 67 are connected to a power divider 68 where phase delay lines 69 are placed between the antenna functions 67 and the power divider 68. The antenna functions 67 radiate antenna radiation lobes 70 in different directions for different frequencies.

Figure 7:
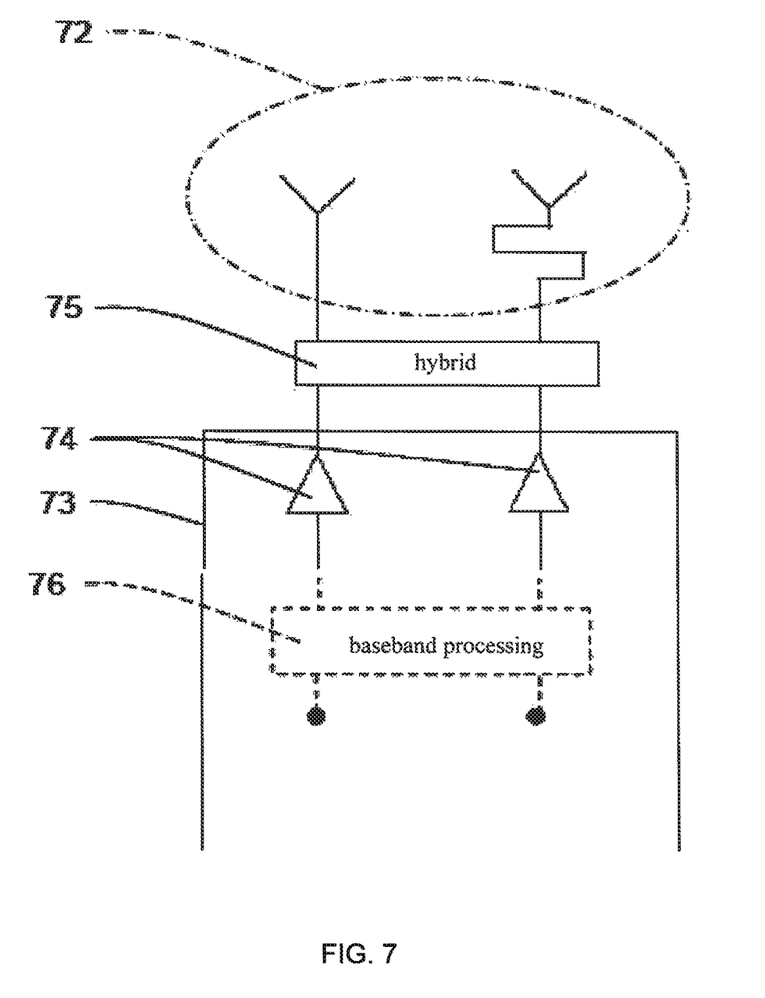
FIG. 7 schematically shows a node according to a fifth example of the present invention.

However, in this example, a phase shifter 71 has been added to one of the two antennas 68. With help of this phase shifter 71, the antenna radiation lobes 70 of the two frequency bands can be pointed in arbitrarily directions, FIG. 7 shows a fifth example of the present invention. In the same way as in several previous examples, antenna functions are connected to phase delay lines as shown with the reference number 72. A transceiver 73 comprises amplifiers 74. In this example, a hybrid 75 has been placed between the amplifiers 74 and the antennas functions/phase delay lines 72. With this architecture, no switching is needed. However, some baseband processing 76 must be done to compensate for the hybrid 75.

For the present invention in its most general form, a node comprises at least a first antenna function 3, 3' and a second antenna function 4, 4' comprising corresponding antenna function port connections 7, 8; 7', 8'. The node also comprises at least one transceiver unit 2, 2a which is arranged to communicate by means of at least one frequency band B. Each port connection 7, 8; 7', 8' is at least connectable to the transceiver unit 2, 2a and is associated with a corresponding phase delay 11, 12, 13, 14; 15, 16 with respect to the transceiver unit 2, 2a. All phase delays 11, 12, 13, 14; 15, 16 are of different magnitudes. In this way, in a first mode of operation, for each frequency $f_1, f_2, f_3, f_4; f_1', f_2', f_3', f_4'$ in the frequency band (B), a certain resulting main radiation lobe 17, 18, 19, 20; 21, 22, 23, 24 is acquired when the antenna functions are receiving and/or transmitting, a main pointing direction 25, 26, 27, 28; 29, 30, 31, 32 of said main radiation lobe 17, 18, 19, 20; 21, 22, 23, 24 having a certain angular direction $\alpha_1, \alpha_2, \alpha_3, \alpha_4; \beta_1, \beta_2, \beta_3, \beta_4$ in azimuth.

Of course, the present invention can be applied for having antenna radiation lobes being directed in different directions for different frequencies in elevation as well; all the examples discussed may be applied for elevation as well as for azimuth. Normally, one of the azimuth and elevation angle is practically the same for all frequencies, but the antenna functions may be designed to have antenna radiation lobes that are directed in different directions for different frequencies in both azimuth and elevation.

Figure 8:
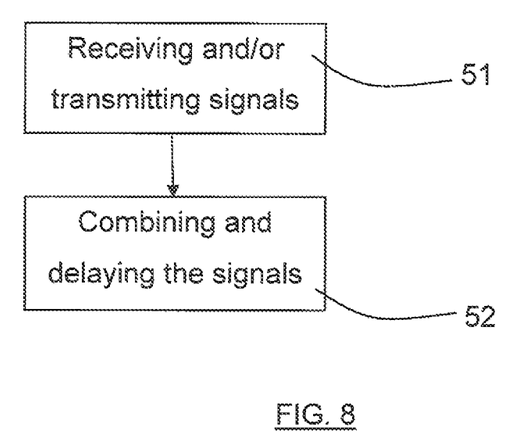
FIG. 8 shows a flow chart of a method according to the present invention.

With reference to FIG. 8, the present invention also relates to a method in a node in a wireless communication system, the method comprising the steps:

51: receiving and/or transmitting signals using at least a first antenna function 3, 3' and a second antenna function 4, 4' when communicating using at least one frequency band B; and

52: combining and delaying the signals to and/or from the antenna functions 3, 4; 3', 4' such that for each frequency $f_1, f_2, f_3, f_4; f_1', f_2', f_3', f_4'$ in the frequency band B, a certain resulting main radiation lobe 17, 18, 19, 20; 21, 22, 23, 24 is acquired when the antenna functions 3, 4; 3', 4' are receiving and/or transmitting. A main pointing direction 25, 26, 27, 28; 29, 30, 31, 32 of said main radiation lobe 17, 18, 19, 20; 21, 22, 23, 24 have a certain angular direction $\alpha_1, \alpha_2, \alpha_3, \alpha_4; \beta_1, \beta_2, \beta_3, \beta_4$ in azimuth and elevation with respect to a fixed angular direction 33, 34 in azimuth and elevation. The angular direction $\alpha_1, \alpha_2, \alpha_3, \alpha_4; \beta_1, \beta_2, \beta_3, \beta_4$ for each frequency $f_1, f_2, f_3, f_4; f_1', f_2', f_3', f_4'$ is different from the angular direction for any other frequency.

Figure 9:
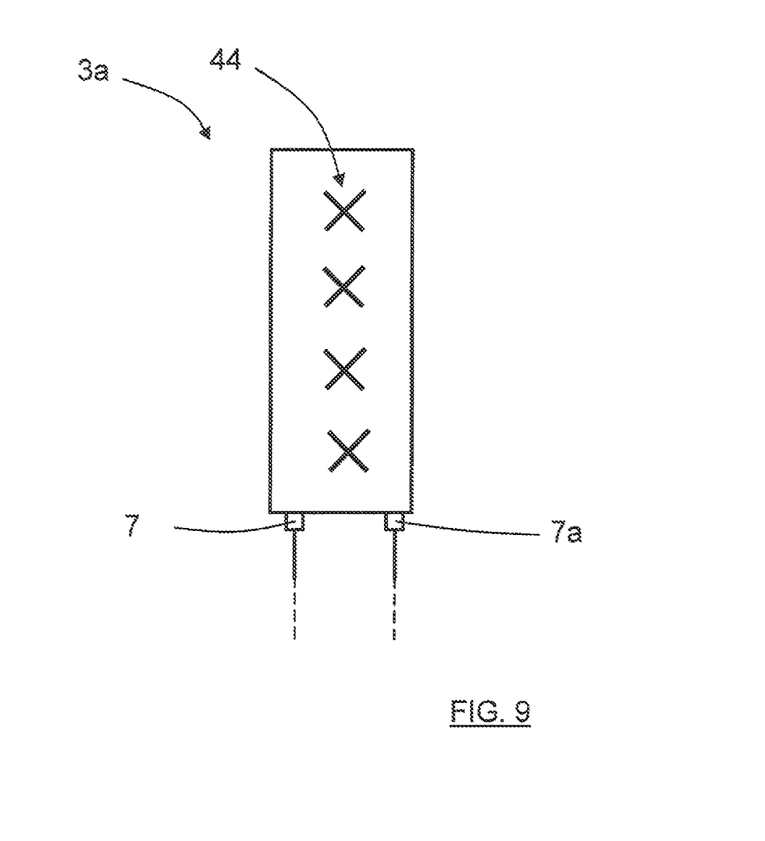
FIG. 9 schematically shows a dual polarized antenna function which is suited for use in a node according to the present invention.

Although the present invention has been described for antenna functions only having on antenna port, a first port, the present invention is of course applicable for other types of antennas, such as for example dual polarized antennas having two ports. With reference to FIG. 9, an antenna function 3a comprises orthogonally polarized antenna elements 44, where each antenna function 3a comprises a port connection 7, 7a for each polarization, in this case a first antenna function first port connection 7 and a first antenna function second port connection 7a. This configuration can be applicable for all antenna functions in the previous examples.

The present invention is not limited to the examples above, but may within the scope of the appended claims. For example, each antenna function can have any suitable polarization with corresponding antenna ports, and may in itself comprise any suitable number of antennas. Each antenna comprised in the antenna functions may comprise any suitable number of antenna elements, the antenna elements being of any desired type such as patches, slots, dipoles and any combination thereof.

The first phase delay line 11 is shown as a straight conductor in FIG. 1a and FIG. 2a, while the following delay lines 12, 13, 14 are shown as meandered conductors of increasing length. This should, however, only be interpreted symbolically, since there are many ways to realize a phase delay line for all the examples, such as for example by means of phase shifters.

The term phase delay line may be constituted by time delay or frequency dependent phase delay, and is generally to be regarded as an electrical signal delay.

In the examples, four frequencies with corresponding main radiation lobes have been disclosed, but the number of frequencies in the frequency band B used may vary, and is normally limited by the bandwidth needed for each carrier frequency, i.e. by the frequency resolution in the system.

An important feature of the present invention is to provide an analog architecture for varying the phase settings on each antenna element over frequency for an antenna array. How the phase settings on each antenna element vary over frequency can be either fixed or adaptive.

One typical application where the present invention could be applied is when using antenna muting for low traffic scenarios.

The present invention has been described for a node in a wireless communication system, where such a node for example may be constituted by a base station, relays, repeaters and user terminals.

As mentioned previously, the present invention is applicable for both transmission reception, and the power divider 35, 35' thus generally constitutes a power combining and/or power dividing means 35, 35', where the input and/or output ports generally constitute individual ports.

The general term switching means have been used for the switches 36, 42, 36', 42', 43 described. The switching means may be constituted by any kind of suitable switches, such as for example PIN diode switches or mechanical switches.

The invention claimed is:

1. A node in a wireless communication system, the node comprising:
    (1) a transceiver unit being arranged to communicate using at least one frequency band (B);
    (2) a first antenna function comprising a first port connection connectable to said transceiver unit via a first electrical signal delay line having a first length; and
    (3) a second antenna function comprising a second port connection connectable to said transceiver unit via a second electrical signal delay line having a second length that is greater than the first length, wherein
    the difference in length between the first signal delay line and the second signal delay line is a multiple of the wavelength of said frequency band's middle frequency, and
    said first and second electrical signal delay line being arranged to enable a first mode of operation where, for each frequency in the frequency band, a certain resulting main radiation lobe is acquired when the first and second antenna functions are receiving and/or transmitting, said main radiation lobe having a main pointing direction having a certain angular direction in azimuth and elevation with respect to a fixed angular direction in azimuth and elevation, the angular direction for every certain frequency being different from the angular direction for any other frequency.

2. The node according to claim 1, wherein said port connections are connectable to said transceiver unit via a power means and a first switching means positioned between a common port of the power means and said transceiver unit, the power a first power means port for connecting to the first port connection and a second power means port for connecting to the second port connection.

3. The node according to claim 2, further comprising a second switch for connecting the first power means port to the first port connection.

4. The node according to claim 3, wherein the first switching means and the second switching means are arranged to switch said transceiver unit to be directly connected to the first port connection in a second switch mode, and to switch said transceiver unit to be connected to the first port connection via the power means in a first switch mode.

5. The node according to claim 4, wherein the power means is connectable to the second port connection via a third switching means, where the third switching means is arranged to switch said transceiver unit to be connected to the second port connection in a first switch mode, and to switch a further transceiver unit to be connected to the second port connection in a second switch mode.

6. The node according to claim 5, wherein the first switch mode and the second switch mode is common for the first switching means, second switching means and third switching means, the first switch mode corresponding to the first mode of operation.

7. The node according to claim 1, wherein each antenna function comprises orthogonally polarized antenna elements, where each antenna function comprises a port connection for each polarization.

8. The node according to claim 1, wherein each antenna function comprises a corresponding duplex filter such that each antenna function is arranged for both transmission and reception.

9. The node according to claim 1, wherein the power means is constituted by a hybrid.

10. The node according to claim 1, wherein each electrical signal delay is constituted by a delay line where each delay line is an integer times a wavelength corresponding to a suitable frequency in said frequency band, said integer starting with zero for the first antenna function and increasing for each further antenna function.

11. A method in a node in a wireless communication system using at least one frequency band having a middle frequency, the method comprising:
    receiving a first signal using a first antenna function;

receiving a second signal using a second antenna function;

delaying the first received signal a first amount; and delaying the second received signal a second amount that is different than the first amount, wherein the difference between said first amount of delay and said second amount of delay is a multiple of the wavelength of said frequency band's middle frequency, said delays are arranged to enable that, for each frequency in the frequency band, a certain resulting main radiation lobe is acquired said main radiation lobe having a main pointing direction having a certain angular direction in azimuth and elevation with respect to a fixed angular direction in azimuth and elevation, the angular direction for each frequency being different from the angular direction for any other frequency.

12. The method according to claim 11, wherein the method comprises the step of:

switching at least one transceiver unit between a first port connection and a power means.

13. The method according to claim 12, wherein the method comprises the step of:

switching a second port connection between a second transceiver unit and an individual port of the power means via a second electrical signal delay.

14. The method according to claim 11, wherein the method comprises the step of:

using a corresponding duplex filter in each antenna function such that each antenna function is usable for both transmission and reception.

15. The method according to claim 11, wherein a hybrid is used as a power means.

16. A method in a node in a wireless communication system using at least one frequency band having a middle frequency, the method comprising:

a transceiver unit outputting a signal;

a power dividing unit receiving said signal and dividing said signal to produce at least a first output signal and second output signal;

a first antenna function receiving said first output signal via a first signal delay line; and a second antenna function receiving said second output signal via a second signal delay line that is longer than the first signal delay line, wherein the difference between length of said first signal delay line and the length of said second signal delay line is a multiple of the wavelength of said frequency band's middle frequency, said delays are arranged to enable that, for each frequency in the frequency band, a certain resulting main radiation lobe is acquired, said main radiation lobe having a main pointing direction having a certain angular direction in azimuth and elevation with respect to a fixed angular direction in azimuth and elevation, the angular direction for each frequency being different from the angular direction for any other frequency.

17. The method of claim 16, wherein said power dividing unit receives said signal via a switch positioned between the power dividing unit and the transceiver unit.

18. The method of claim 16, further comprising:

the power dividing further producing a third output signal from said signal received from the transceiver unit; and a third antenna function receiving said third output signal via a third signal delay line that is longer than the second signal delay line, wherein the difference between length of said third signal delay line and the length of said second signal delay line is a multiple of the wavelength of said frequency band's middle frequency.

\* \* \* \* \*